United States Patent
Benson et al.

(10) Patent No.: US 6,789,151 B1
(45) Date of Patent: Sep. 7, 2004

(54) DIP SWITCH CONFIGURATION FOR INCREASED USABILITY WITH MULTIPLE CARDS

(75) Inventors: Anthony J Benson, Roseville, CA (US); Chadi F. Theodossy, Rocklin, CA (US); Joanna Baisden, Rancho Cordova, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 387 days.

(21) Appl. No.: 09/810,965

(22) Filed: Mar. 17, 2001

(51) Int. Cl.$^7$ .............................................. G06F 13/14
(52) U.S. Cl. ....................................... 710/305; 710/62
(58) Field of Search ............................... 710/1, 62, 14, 710/107, 305, 306, 301, 314; 361/191; 713/330, 340

(56) References Cited

U.S. PATENT DOCUMENTS 5,745,795 A * 4/1998 Pecone et al. ................ 710/62
6,055,582 A * 4/2000 Pascarella et al. ............ 710/14
6,513,086 B1 * 1/2003 Haddad et al. ............. 710/305
6,567,879 B1 * 5/2003 Benson et al. .............. 710/305

* cited by examiner

Primary Examiner—Khanh Dang (57) ABSTRACT

A backplane includes two data buses and two slots, each slot having two connectors, where each connector in the slot connects to a different data bus. The slots are adapted to receive two bus controller cards each having two backplane connectors, where the installed orientation of one card is opposite from the other installed card. On a particular bus controller card, each backplane connector is associated with a different data bus, depending on the slot into which the card is inserted. After insertion into a slot in the mass storage unit, a card recognizes the data bus connected to each backplane connector via the slot, and defines the relationship between the setting of each switch and control signals relating to the card and the backplane. The DIP switch settings for a card can then remain the same, independent of the particular slot into which the card is inserted.

17 Claims, 4 Drawing Sheets

DIP SWITCH CONFIGURATION FOR INCREASED USABILITY WITH MULTIPLE CARDS

CROSS-REFERENCES

The present invention is related to subject matter disclosed in the following co-pending patent applications:

1. U.S. patent application Ser. No. 09/811,194 entitled, "Redundant, High-Availability Storage System", naming Anthony J. Benson and James J. deBlanc as inventors and filed on even date herewith.
2. U.S. patent application Ser. No. 09/810,965 entitled, "Data Corruption Avoidance on a Backplane Bus Adapted to Receive Bus Controller Cards of Different Types", naming Anthony J. Benson and Patrick McGoey as inventors and filed on even date herewith.
3. U.S. patent application Ser. No. 09/811,193 entitled, "Multiple-Path Interface Card for Interfacing Multiple Isolated Interfaces to a Storage System", naming Anthony J. Benson and James J. deBlanc as inventors and filed on even date herewith.
4. U.S. patent application Ser. No. 09/811,192 entitled, "Circuit for Switching One or More HVD Transceivers", naming Anthony J. Benson as inventor and filed on even date herewith.
5. U.S. patent application Ser. No. 09/810,963 entitled, "Management of Communication Bus Resets", naming Anthony J. Benson, James L. White, and Dovard K. Howard as inventors and filed on even date herewith.
6. U.S. patent application Ser. No. 09/811,196 entitled, "Communication Bus Controller Including Designation of Primary and Secondary Status According to Slot Position", naming Anthony J. Benson, James L. White, and Dovard K. Howard as inventors and filed on even date within herewith.
7. U.S. Pat. No. 6,567,879 entitled, "Management of Resets for Interdependent Dual Small Computer Standard Interface (SCSI) Bus Controllers", Anthony J. Benson, et al.

FIELD OF THE INVENTION

This invention relates to interface cards, and more particularly to configuring multiple bus controller cards utilized in a single mass storage unit.

BACKGROUND

Mass storage units are commonly used in applications where large amounts of data need to be stored. Typically, such mass storage units each contain a number of disk drives connected via a bus, such as a Small Computer System Interface (SCSI) bus that is standard in the art. Such mass storage units typically include one or more bus controller cards to control the bus. Those one or more cards generally connect to a backplane on which the bus is implemented. Bus controller cards may be configured via switches, jumpers or other physical controls on the cards that allow a user to reconfigure the cards as needed.

The configuration of the bus controller cards may depend on their orientation with regard to mating connectors on the backplane. If the bus controller slots are not aligned in the same direction, it may be difficult to configure the bus controller cards properly before or after insertion into the slots, as the user may not understand the proper frame of reference for each card, and may then set the switches, jumpers or other controls incorrectly for one or more bus controller cards.

SUMMARY

A bus controller card for a backplane of a mass storage unit detects its position in the backplane, and accordingly manages the relationship between DIP switches on the card and control signals to the card and the backplane.

In one aspect of the invention, a backplane includes two data buses and two slots, each slot having two connectors, where each connector in the slot connects to a different data bus. The slots are adapted to receive two bus controller cards each having two backplane connectors, where the installed orientation of one card is opposite from the other installed card. On a particular bus controller card, each backplane connector is associated with a different data bus, depending on the slot into which the card is inserted.

In another aspect of the invention, each bus controller card has one or more DIP switches controlling certain operational characteristics of the card. After insertion into a slot in the mass storage unit, a card recognizes the data bus connected to each backplane connector via the slot, and defines the relationship between the setting of each switch and control signals relating to the card and the backplane. The DIP switch settings for a card can then remain the same, independent of the particular slot into which the card is inserted. In this way, insertion of bus controller cards in different installed orientations is simplified.

The invention will be more fully understood upon consideration of the detailed description below, taken together with the accompanying drawings.

BRIEF DESCRIPTION OF THE DRAWINGS

Use of the same reference symbols in different figures indicates similar or identical items.

DETAILED DESCRIPTION

Figure 1:
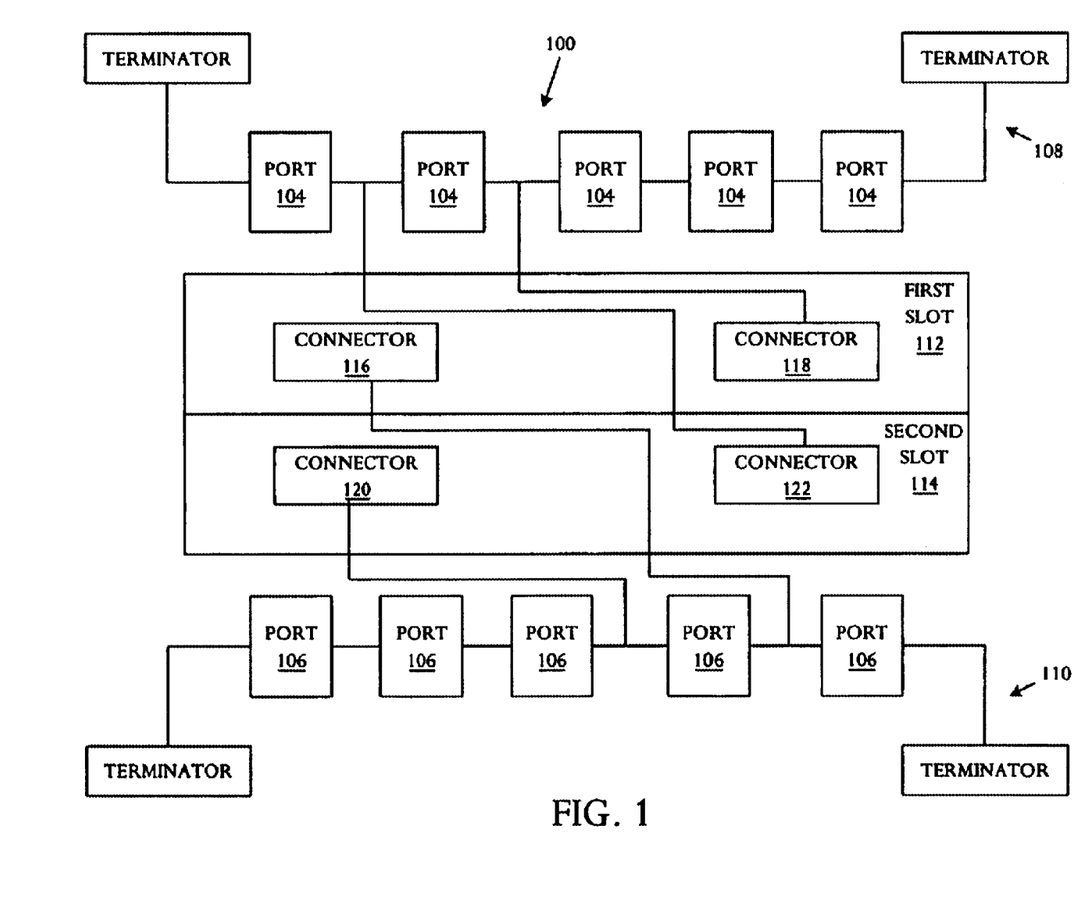
FIG. 1 is a schematic view of a backplane having a SCSI bus divided into a group of even ports and a group of odd ports, and two slots for receiving bus controller cards.

Referring to FIG. 1, a schematic block diagram of a backplane 100 is shown. The backplane 100 can be a printed circuit board that may be utilized as a component within another assembly, such as a mass storage unit. A first bus 108 and a second bus 110 are implemented on the backplane 100, as standard SCSI buses. However, the buses 108, 110 may be another type of bus, if desired. The first bus 108 includes a number of ports 104, each having the same physical configuration. The ports 104 each are adapted to connect to a peripheral device, such as a disk drive. The second bus 110 includes a number of ports 106, each having the same physical configuration. The ports 106 each are adapted to connect to a peripheral device, such as a disk drive.

A first bus controller slot 112 and a second bus controller slot 114 are preferably included on the backplane 100. The first bus controller slot 112 preferably includes a first connector 116 electrically connected to the second bus 110, and a second connector 118 electrically connected to the first bus 108. The second bus controller slot 114 preferably includes a first connector 120 electrically connected to the second bus 110, and a second connector 122 electrically connected to the first bus 108. The connectors 116, 118 in the first bus controller slot 112 are physically and electrically configured to receive a bus controller card. The connectors 120, 122 in the second bus controller slot 114 are also physically and electrically configured to receive a similar or identical bus controller card. Preferably, the first bus 108 and the second bus 110 are connected only through one or more bus controller cards inserted into the first bus controller slot 112 and/or the second bus controller slot 114. That is, the first bus 108 is separated physically and electrically from the second bus 110, such that the only connection or connections between the two partitions 108, 110 are made via one or more bus controller cards.

Figure 2:
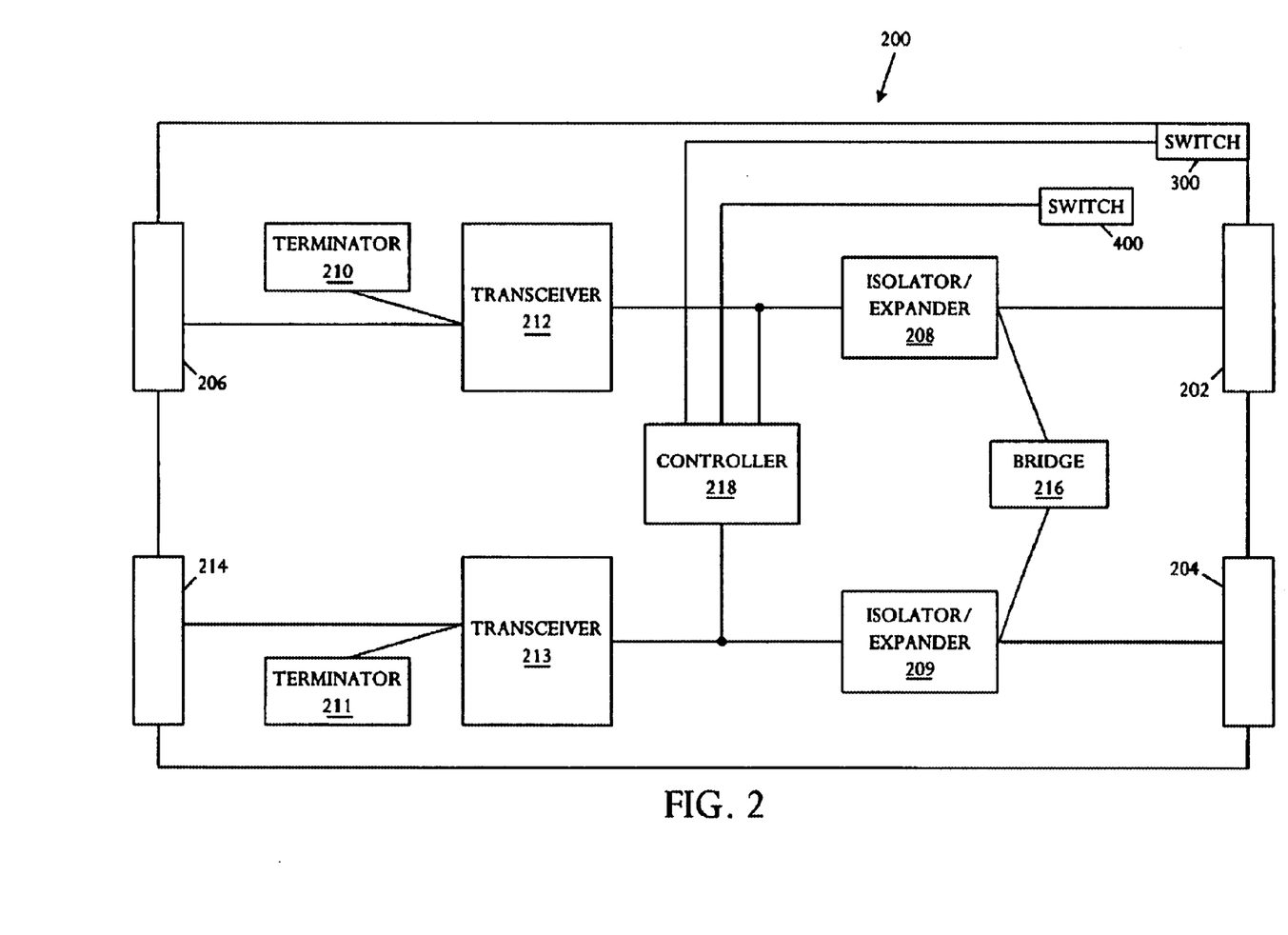
FIG. 2 is a schematic view of a bus controller card.

Referring as well to FIG. 2, a schematic of a bus controller card 200 is shown. Preferably, the bus controller card 200 is physically and electrically adapted to be received by either the first bus controller slot 112 or the second bus controller slot 114. The bus controller card 200 includes a first backplane connector 202 and a second backplane connector 204, physically and electrically adapted to interface with the connectors 116, 118 in the first bus controller slot 112, or the connectors 120, 122 in the second bus controller slot 114. The first backplane connector 202 and the second backplane connector 204 may be any type of connector useful for electrically linking the card 200 to the backplane 100. In one embodiment, the first backplane connector 202 and the second backplane connector 204 are both 240 pin count connectors available from Berg-Metral, part number 73981-102. The physical configuration of the first backplane connector 202 and the second backplane connector 204 on the card 200 is determined by the physical positioning of the connectors 116, 118, 120, 122 in each bus controller slot 112, 114.

The first backplane connector 202 is electrically connected to a first host connector 206 on the card 200, where the first host connector 206 is adapted for connection to a host computer (not shown). Between the first backplane connector 202 and the first host connector 206, the card 200 may include one or more electrical components, depending on the particular configuration of the card 200. Preferably, where the first host connector 206 receives voltage-differential input or transmits voltage-differential output, and the buses 108, 110 are SCSI buses, the card 200 includes a first transceiver 212. The first transceiver 212 converts the voltage levels of differential signals to the voltage level of signals utilized on a single-ended bus. In one embodiment, the transceiver 212 is a 9-Channel Differential Transceiver from Texas Instruments, part number SN75976A. The first transceiver 212 is electrically connected to the first host connector 206. Such a card 200 also preferably includes a first terminator 210 associated with the first backplane connector 202, which is required at an end of a SCSI or other single-ended bus. In one embodiment, the terminator is a DS2108 terminator from Dallas Semiconductor. Further, such a card 200 also includes a first isolator/expander 208, used to electrically isolate and retime signals on the single-ended bus, such as SCSI signals. The first isolator/expander 208 preferably also isolates the buses 108, 100 on the backplane 100 from the circuitry on the card 200. The first isolator/expander 208 is preferably located between, and electrically connected to both, the first backplane connector 202 and the transceiver 212. In one embodiment, the first isolator/expander 208 is an integrated circuit from LSI Logic, part number SYM53C140. Together, the first host connector 206, the first transceiver 212, the first isolator/expander 208, and the first backplane connector 202 define a first signal path 250. Signals can travel in both directions along the first signal path 250.

Similarly, the second backplane connector 204 is electrically connected to a second host connector 214 on the card 200, where the second host connector 214 is adapted for connection to a host computer (not shown). Between the second backplane connector 204 and the second host connector 214, the card 200 preferably includes a second transceiver 213 and a second isolator/expander 209 located between, and electrically connected to both, the second backplane connector 204 and the second transceiver 213. The card 200 also includes a second terminator 211 associated with the second backplane connector 204. Together, the second host connector 214, the second transceiver 213, the second isolator/expander 209 and the second backplane connector 204 define a second signal path 260. Signals can travel in both directions along the second signal path 260.

Preferably, the card 200 includes a bridge 216. The bridge 216 provides a controllable connection between the first bus 108 and the second bus 110. In one embodiment, the bridge 216 is the same integrated circuit used as the isolator/expander 208, 209, and preferably connects both isolator/expanders 208, 209. However, the bridge 216 may connect the first bus 108 to the second bus 110 at a different location on the card 200.

A controller 218 is also included on the card 200. The controller 218 is electrically connected to the other components on the card 200, such as the backplane connectors 202, 204, the host connectors 206, 214, the transceivers 212, 213, the terminators 210, 211, the isolator/expanders 208, 209 and the bridge 216. The connection between the controller 218 and the other components on the card 200 is preferably made by connecting to the circuitry on the card 200 that is in place to interlink those components, but may be made directly to each component if desired. The controller 218 preferably receives signals from and transmits command signals to those components on the card 200. In one embodiment, the controller 218 is a PLD chip from Altera, part number EPF6016A0C208-2. While the components on the card 200 have been discussed as separate and discrete components, they may be combined as desired to form larger or different integrated circuits or electrical assemblies, if desired.

Figure 3:
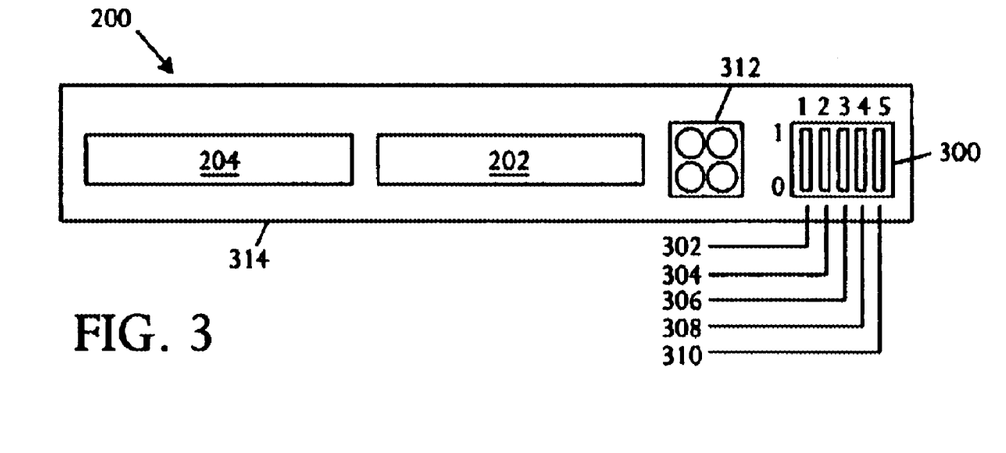
FIG. 3 is a schematic end view of a bus controller card.

Referring as well to FIG. 3, a schematic of an end view 1 of the card 200 is shown. The first backplane connector 202 is positioned adjacent to the second backplane connector 204. However, other configurations and relative positions of the backplane connectors 202, 204 are possible. The card 200 also includes a panel switchbox 300. The panel switchbox 300 preferably includes a first DIP switch 302, a second DIP switch 304, a third DIP switch 306, a fourth DIP switch 308, and a fifth DIP switch 310. However, other types of switches may be used if desired, and additional switches may be provided if desired. Preferably, the panel switchbox 300 is located on the same end of the card 200 as the backplane connectors 202, 204, such that the DIP switches 302–310 are facing outward from and accessible from that end of the card 200. The functions of the DIP switches 302–310 are shown in Table 1.

TABLE 1

Functions of DIP Switches On Panel Switchbox 300

| DIP Switch | Function |
| --- | --- |
| First DIP Switch 302 | Determines whether bridge 216 is enabled. |
| Second DIP Switch 304 | Determines addresses for ports 106 of second bus 110. |
| Third DIP Switch 306 | Turns internal termination on or off for second host connector 216. |
| Fourth DIP Switch 308 | Determines addresses for ports 104 of first bus 108. |
| Fifth DIP Switch 310 | Turns internal termination on or off for first host connector 206. |

The function assignments listed in Table 1 may be changed if desired, such that different functions are mapped to different DIP switches. These switches 302–310 are utilized to control the operational configuration of the backplane 100 and of the system utilizing the backplane 100. As seen in Table 1, the second DIP switch 304 and the fourth DIP switch 308 are each associated with a particular bus, rather than a particular backplane connector 202, 204. Preferably, the first DIP switch 302, the second DIP switch 304 and the fourth DIP switch 308 are electrically connected to the controller 218. In this way, the positions of the switches 302, 304, 308 provide inputs to the controller 218, which acts on those inputs to control the appropriate components on the card 200. Preferably, the third DIP switch 306 controlling internal termination relative to the second host connector 216 is directly connected to the second terminator 211, and the fifth DIP switch 310 controlling internal termination relative to the first host connector 206 is directly connected to the first terminator 210. In this way, the third and fifth DIP switches 306, 310 can control bus termination whether or not power is applied to the controller 218.

The card 200 optionally may include a status light assembly 312 adapted to display one or more lights when certain activities are taking place over the bus. The configuration and presence of the status light assembly 312 are not critical to the invention.

Figure 4:
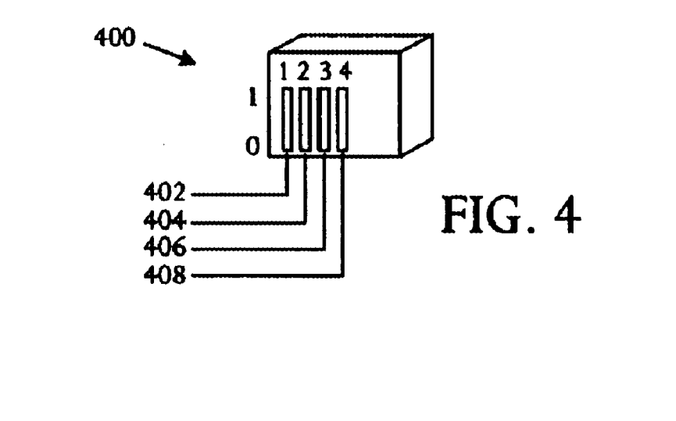
FIG. 4 is a schematic view of an internal DIP switch of a bus controller card.

Referring as well to FIG. 4, a schematic view of an internal switchbox 400 is shown. The internal switchbox 400 is preferably located on the upper surface of the card 200. The card 200 is preferably enclosed for protection; while the enclosure is not shown for clarity, the internal switchbox 400 is referred to as "internal" because it is located within that enclosure. The internal switchbox 400 preferably includes a first DIP switch 402, a second DIP switch 404, a third DIP switch 406 and a fourth DIP switch 408. However, other types of switches may be used if desired, and additional switches may be provided. The functions of the DIP switches 402–408 are shown in Table 2.

TABLE 2

Functions of DIP Switches On Internal Switchbox 400

| DIP Switch | Function |
| --- | --- |
| First DIP Switch 402 | Enables second bus 110 reset on disk drive insertion into or removal from a port 106. |
| Second DIP Switch 404 | Enables bus reset on second bus 110 power fail. |
| Third DIP Switch 406 | Enables first bus 108 reset on disk drive insertion into or removal from a port 104. |
| Fourth DIP Switch 408 | Enables bus reset on first bus 108 power fail. |

The function assignments listed in Table 2 may be changed if desired, such that different functions are mapped to different DIP switches, or the order of the DIP switches is changed. These switches 402–408 are utilized to control the operational configuration of the backplane 100 and of the system utilizing the backplane 100. Preferably, the switches 402–408 are electrically connected to the controller 218. In this way, the positions of the switches 402–408 provide inputs to the controller 218, which acts on those inputs to control the appropriate components on the card 200. Alternately, one or more of the switches 402–408 may be connected directly to one or more components on the card 200 to control directly those particular components. Additional switches may be provided in one or both switchboxes 300, 400 to provide additional functionality, if desired.

Figure 5:
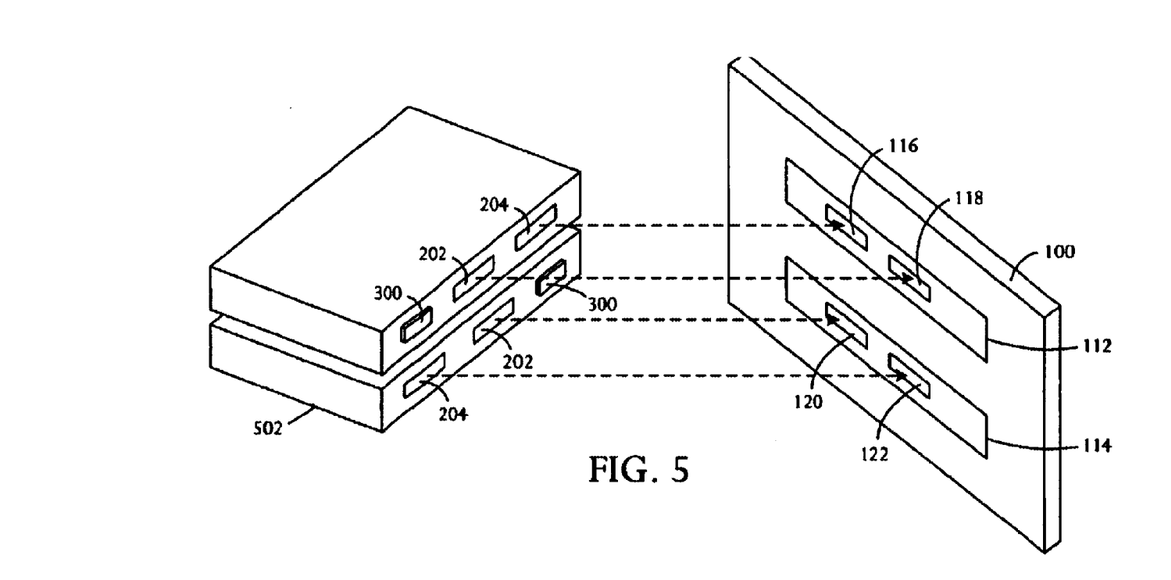
FIG. 5 is an exploded schematic view of two bus controller cards inserted into the backplane of FIG. 1.

Referring as well to FIG. 5, a backplane 100 receives a first bus controller card 500 and a second bus controller card 502. The first bus controller card 500 and the second bus controller card 502 each are the same as the card 200 described above. The first bus controller card 500 is inserted into the first bus controller slot 112, and the second bus controller card 502 is inserted into the second bus controller slot 114. Preferably, the first bus controller card 500 is installed into the first bus controller slot 112 in an orientation opposite from the orientation of the installation of the second bus controller card 502 into the second bus controller slot 114. By way of example, in one embodiment each bus controller card 500, 502 has a bottom surface 314, where the second bus controller card 502 is oriented such that its bottom surface 314 faces downward, and the first bus controller card 500 is oriented such that its bottom surface 314 faces upward. Therefore, connector 116 in the first bus controller slot 112 and connector 120 in the second bus controller slot 114 are both electrically connected to the second bus 110. Further, connector 118 in the first bus controller slot 112 and connector 122 in the second bus controller slot 114 are both electrically connected to the first bus 108. As a result, the first backplane connector 202 of the first bus controller card 500 connects to a different bus than the first backplane connector 202 of the second bus controller card 502. Similarly, the second backplane connector 204 of the first bus controller card 500 connects to a different bus than the second backplane connector 204 of the second bus controller card 502. Thus, the first backplane connector 202 and the second backplane connector 204 of each bus controller card 500, 502 are each associated with a different bus 108, 110, depending on the slot 112, 114 into which the particular bus controller card 500, 502 is inserted. As a result, the first signal path 250 and the second signal path 260 of each bus controller card 500, 502 are each associated with a different bus 108, 110.

The panel switchbox 300 and the internal switchbox 400 on each bus controller card 500, 502 are used to configure that card 500, 502. The switches 302–310 on both bus controller cards 500, 502 are set in a manner that allows the cards 500, 502 to operate simultaneously without creating conflicts on the buses 108, 110. In order to facilitate the proper setting of the switches 302–310 on each bus controller card 500, 502, the relationship between the switches 302–310 and the backplane connectors 202, 204 on each bus controller card 500, 502 changes depending on the orientation with which each particular card 500, 502 is inserted into one of the bus controller slots 112, 114. That is, each bus controller card 500, 502 detects its orientation in one of the bus controller slots 112, 114, then accordingly manages the relationship between DIP switches on the card and control signals to the card and the backplane. The controller 218 of each bus controller card 500, 502 detects the card's orientation in a particular slot 112, 114 by checking each backplane connector 202, 204 for the presence of a signal or signals characteristic of the first bus 108 and/or the second bus 110. Such a signal may be a clock signal associated with a particular bus 108, 110, a dedicated enabling or monitor signal associated with a particular bus 108, 110, or another signal. The particular signal or signals utilized are not critical to the invention.

Figure 6:
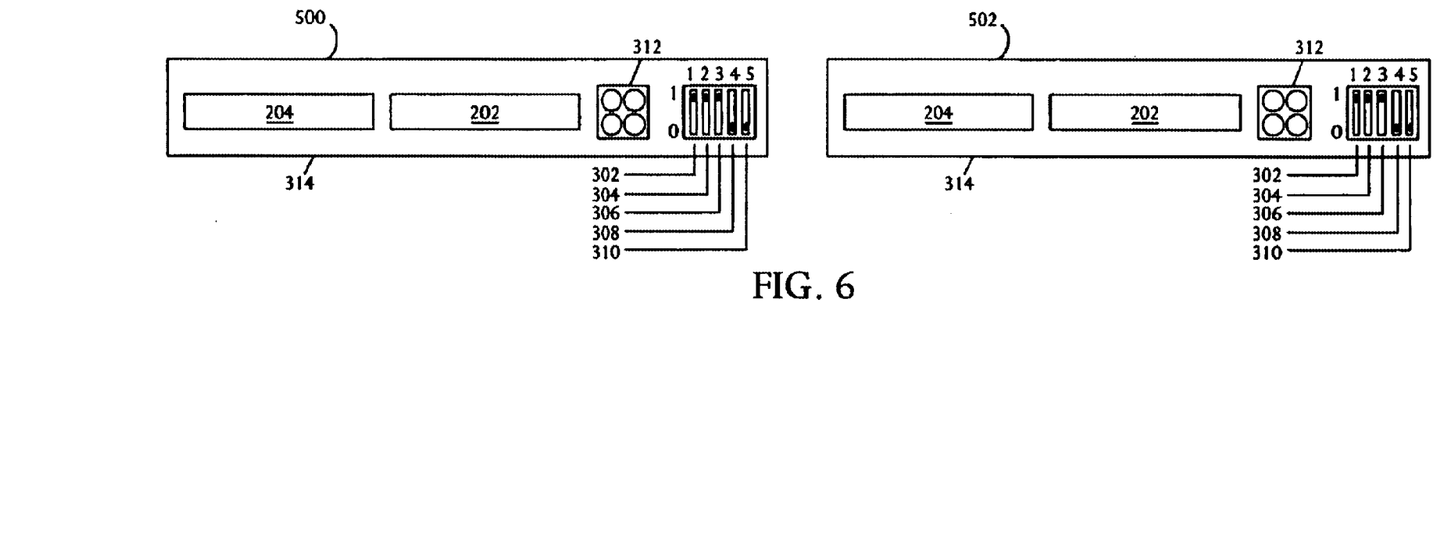
FIG. 6 is a schematic end view of a first bus controller card and a second bus controller card placed in a reference orientation with regard to one another.

Because the controller 218 detects the orientation of each card 500, 502 in a particular slot 112; 114, the controller 218 assigns the functions of the second DIP switch 304 and the fourth DIP switch 308, which are associated with a particular bus 108, 110, to the proper signal path 250, 260 on the particular card 500, 502. As a result, in a preferred embodiment the position of the switches 302–310 on each bus controller card 500, 502 is identical when the cards 500, 502 are both oriented with their bottom surfaces 314 facing in the same direction, as seen in FIG. 6. That is, the switches 302–310 have the same position on each card 500, 502 when the cards 500, 502 both are viewed in a reference orientation. In this way, a technician or user may place both bus controller cards 500, 502 on a tabletop or other flat surface and configure the switches 302–310 of each bus controller card 500, 502 in the identical manner, easily configuring the bus controller cards 500, 502 for simultaneous operation on the backplane 100. However, the cards need not be physically placed in a reference orientation when the switches 302–310 are set. That is, a user may visualize a reference orientation while setting the switches 302–310, thereby placing the bus controller cards 500, 502 in a reference orientation without physically moving the cards 500, 502.

An example of the orientation of the switches 302–310 on each card 500–502 is shown in FIGS. 5 and 6. In an exemplary embodiment, the first bus controller card 500 is inserted into the first bus controller slot 112, oriented with its bottom surface 314 facing upward. Thus, the first backplane connector 202 of the first bus controller card 500 is connected to the second connector 118 of the first bus controller slot 112, such that the first backplane connector 202 of the first bus controller card 500 is connected to the first bus 108. Consequently, the first signal path 250 on the first bus controller card 500 is connected to the first bus 108. Also, the second backplane connector 204 of the first bus controller card 500 is connected to the first connector 116 of the first bus controller slot 112, such that the second backplane connector 204 of the first bus controller card 500 is connected to the second bus 110. Consequently, the second signal path 260 on the first bus controller card 500 is connected to the second bus 110. The second bus controller card 502 is inserted into the second bus controller slot 114, oriented with its bottom surface 314 facing downward. Thus, the first backplane connector 202 of the second bus controller card 502 is connected to the first connector 120 of the second bus controller slot 114, such that the first backplane connector 202 of the second bus controller card 502 is connected to the second bus 110. Consequently, the first signal path 250 of the second bus controller card 502 is connected to the second bus 110. Also, the second backplane connector 204 of the second bus controller card 502 is connected to the second connector 122 of the second bus controller slot 114, such that the second backplane connector 204 of the second bus controller card 502 is connected to the first bus 108. Consequently, the second signal path 260 of the second bus controller card 502 is connected to the first bus 108.

Turning to FIG. 6, the switches 302–310 of both bus controller cards 500, 502 are in the same position when the two bus controller cards 500, 502 are in the same orientation, which may be an orientation in which the bottom surface 314 of each card 500, 502 is resting on the same flat surface, such as a tabletop. In this way the positions of the switches 302–310 on each card 500, 502 can be inspected visually to determine easily whether the switches 302–310 are in the same position on each card 500, 502. Looking to the first bus controller card 500, and referring to Table 1, the first DIP switch 302 is set high to activate the bridge 216. The second DIP switch 304 is set high to address the second bus 110 with a first set of addresses, where the first set of addresses is provided for the ports 106 of the second bus 110 and a second set of addresses is provided for the ports 104 of the first bus 108. The high position is associated with the first set of addresses and the low position is associated with the second set of addresses. The second bus 110 is associated with the second backplane connector 204 of the first bus controller card 500, and the first connector 116 of the first bus controller slot 112. Thus, second bus 110 addressing is performed via the second backplane connector 204 of the first bus controller card 500. The third DIP switch 306 is set high to turn on internal termination for the second host connector 214, thereby activating the second terminator 211. The second terminator 211 terminates inside the first bus controller card 500 an external bus connected to the second host connector 214. The fourth DIP switch 308 is set low to address the first bus 108 with the second set of addresses. The first bus 108 is associated with the first backplane connector 202 of the first bus controller card 500, and the second connector 118 of the first bus controller slot 112. Thus, first bus 108 addressing is performed via the first backplane connector 202 of the first bus controller card 500. The fifth DIP switch 310 is set low to turn off internal termination for the first host connector 206, thereby deactivating, or not activating, the first terminator 210, such that an external bus connected to the first host connector 206 is not terminated.

Looking to the second bus controller card 502, and referring to Table 1, the first DIP switch 302 is set high to activate the bridge 216. The second DIP switch 304 on the second bus controller card 502 is set high to address the second bus 110 with the first set of addresses. The second bus 110 is associated with the first host connector 206 and the first signal path 250 of the second bus controller card 502, and the first connector 120 of the second bus controller slot 114. Thus, both of the bus controller cards 500, 502 properly address the second bus 110 with a first set of addresses corresponding to the ports 106 of the second bus 110, even though the first bus controller card 500 addresses the second bus 110 via its second backplane connector 204 and the second bus controller card 502 addresses the second bus 110 via its first backplane connector 202. The third DIP switch 306 is set high to turn on internal termination for the second host connector 214, thereby activating the second terminator 211. The second terminator 211 terminates inside the first bus controller card 500 an external bus connected to the second host connector 214. The fourth DIP switch 308 on the second bus controller card 502 is set low to address the first bus 108 with the second set of addresses. The first bus 108 is associated with the second backplane connector 204 and the second signal path 260 of the second bus controller card 502, and the second connector 122 of the second bus controller slot 114. Thus, both of the bus controller cards 500, 502 properly address the first bus 108 with a second set of addresses corresponding to the ports 104 of the first bus 108, even though the first bus controller card 500 addresses the first bus 108 via its first backplane connector 202 and the second bus controller card 502 addresses the first bus 108 via its second backplane connector 204. The fifth DIP switch 310 is set low to turn off internal termination for the first host connector 206, thereby deactivating, or not activating, the first terminator 210, such that an external bus connected to the first host connector 206 is not terminated.

By setting the switches 302–310 on each bus connector card 500, 502 to the same position, the two cards 500, 502 can function together on the backplane 100 without conflict. As can be seen, the second DIP switch 304 and the fourth DIP switch 308 are each associated with a particular bus 108, 110, and the third DIP switch 306 and the fifth DIP switch 310 are each associated with a particular backplane connector 202, 204 on a particular bus controller card 500, 502. Thus, the switches 302–310 on each bus connector card 500, 502 may be set to the same position while the cards 500, 502 are in the same reference position such that the cards 500, 502 function together on the backplane 100 without conflict. Referring to Table 1, it can be seen that the switches 300–310 may be set in other positions, as long as the positions of the switches 300–310 is the same for both cards 500, 502 where both cards 500, 502 are in the same reference orientation. For example, the second DIP switch 304 may be set low and the fourth DIP switch 308 may be set high on both cards 500, 502 to change the addresses assigned to the ports 104, 106 of each bus 108, 110.

The settings of the DIP switches 402–408 on the internal switchbox 400 on each card 500, 502 also correspond in the same manner as the DIP switches 302–310 on each card 500, 502. As an example, if each of the DIP switches 402–408 are set high on the first bus controller card 500, then each of the DIP switches 402–408 on the second bus controller card 502 are also set high.

While the slots 112, 114 in the backplane 100 have been discussed in terms of two back-to-back slots 112, 114, the slots 112, 114 may be placed differently relative to one another. Further, more than two slots 112, 114 may be provided and utilized.

Although the invention has been described with reference to particular embodiments, the description is only an example of the invention's application and should not be taken as a limitation. Consequently, various adaptations and combinations of features of the embodiments disclosed are within the scope of the invention as defined by the following claims and their legal equivalents.

What is claimed is:

1. A bus controller card for use with a backplane having a bus controller slot connected to a first bus including a first plurality of ports and a second bus including a second plurality of ports, comprising:
   a first backplane connector adapted for connection to a card-selectable one of the first bus and the second bus;
   a second backplane connector adapted for connection to the other one of the first bus and the second bus; and
   a first switchbox comprising a plurality of individual switches operationally connected to said first backplane connector and said second backplane connector, the individual switches including a first bus address control switch that controls addressing of the first plurality of ports on said first bus and a second bus address control switch that controls addressing of the second plurality of ports on said second bus, the first and second bus address control switches controlling addressing independent of the first and second bus connections to the first and second backplane connectors.

2. The bus controller card of claim 1, wherein said plurality of individual switches are DIP switches.

3. The bus controller card of claim 1, wherein the bus controller card further comprises:
   a first host connector electrically connected to said first backplane connector along a first signal path; and
   a second host connector electrically connected to said second backplane connector along a second signal path, wherein each said host connector and said switchbox are located on an end of the bus controller card.

4. The bus controller card of claim 3, further comprising:
   a first terminator electrically connected to said first host connector, said first terminator also electrically connected to one said individual switch in said first switchbox; and
   a second terminator electrically connected to said second host connector, said second terminator also electrically connected to a different said individual switch in said first switchbox.

5. The bus controller card of claim 1, further comprising a controller electrically connected to said first switchbox, said first backplane connector and said second backplane connector.

6. A bus controller system, comprising:
   a backplane, comprising:
      a first bus including a first plurality of ports,
      a second bus including a second plurality of ports,
      a first bus controller slot connected to said first bus and said second bus, and
   a second bus controller slot connected to said first bus and said second bus, and two bus controller cards, each card received by one of said bus controller slots, each bus controller card comprising:
      a first backplane connector connected to a card-selectable one of said buses through said respective bus controller slot,
      a second backplane connector connected to the other one of said buses through said respective bus controller slot,
      a first switchbox comprising a plurality of individual DIP switches operationally connected to said first backplane connector and said second backplane connector, the individual DIP switches including a first DIP switch that controls addressing of the first plurality of ports on said first bus and a second DIP switch that controls addressing of the second plurality of ports on said second bus, the first and second DIP switches controlling addressing independent of the first and second bus connections to the first and second backplane connectors.

7. The system of claim 6, wherein said bus controller cards are received in said bus controller slots in different orientations from one another.

8. The system of claim 6, wherein said DIP switches on both of said bus controller cards are set to the same positions where said bus controller cards are in reference orientation.

9. The system of claim 6, wherein each bus controller card further comprises a controller electrically connected to said first switchbox, said first backplane connector, and said second backplane connector.

10. The system of claim 9, wherein said controller is adapted to detect which said bus is connected to each said backplane connector.

11. The system of claim 9, wherein each bus controller card further comprises a second switchbox comprising a plurality of DIP switches, said second switchbox electrically connected to said controller.

12. The system of claim 9, wherein each bus controller card further comprises a bridge electrically connecting the first bus to the second bus.

13. The system of claim 6, wherein each bus controller card further comprises:
- a first host connector electrically connected to said first backplane connector along a first signal path; and
- a second host connector electrically connected to said second backplane connector along a second signal path,
- wherein said first host connector, said second host connector, and said switchbox are located on an end of each said bus controller card.

14. The system of claim 13, wherein each bus controller card further comprises:
- a first terminator electrically connected to said first host connector, said first terminator also electrically connected to one said individual switch in said first switchbox; and
- a second terminator electrically connected to said second host connector, said second terminator also electrically connected to a different said individual switch in said first switchbox.

15. A method for configuring bus controller cards comprising:
- providing a backplane having a bus controller slot connected to a first bus including a first plurality of ports and a second bus including a second plurality of ports;
- providing two bus controller cards, each including at least two backplane connectors and a plurality of switches that control addressing of the plurality of ports on said first and second buses;
- placing the two bus controller cards for viewing in a reference orientation;
- setting the switches on each bus controller card to the same positions when viewed in the reference orientation; and
- inserting each bus controller card into one of the bus controller slots on the backplane in any relative orientation, the bus controller cards controlling addressing independent of the bus connections to the backplane connectors, ensuring multiple card functionality without conflict.

16. The method of claim 15, further comprising:
- detecting a signal at one of the backplane connectors on each bus controller card; and
- determining based on said detected signal which bus is connected to each backplane connector on each bus controller card.

17. The method of claim 15, wherein said inserting further comprises orienting the bus controller cards in different directions from one another, said directions corresponding to the orientation of the bus controller slots.

* * * * *